United States Patent [19]
Zerrer

[11] Patent Number: 4,651,421
[45] Date of Patent: Mar. 24, 1987

[54] CUTTERHEAD FOR A VEGETATION CUTTER

[75] Inventor: Gerhard Zerrer, Korb, Fed. Rep. of Germany

[73] Assignee: Andreas Stihl, Waiblingen, Fed. Rep. of Germany

[21] Appl. No.: 824,149

[22] Filed: Jan. 30, 1986

[30] Foreign Application Priority Data

Jan. 31, 1985 [DE] Fed. Rep. of Germany ....... 3503237

[51] Int. Cl.$^4$ ............................................ A01D 50/00
[52] U.S. Cl. ..................................... 30/347; 56/12.7
[58] Field of Search ..................... 30/347, 276; 56/12.7

[56] References Cited

U.S. PATENT DOCUMENTS

| | | | |
|---|---|---|---|
| 4,104,796 | 8/1978 | Sheldon | 30/276 |
| 4,236,309 | 12/1980 | Cayou | 56/12.7 |
| 4,274,201 | 6/1981 | Oberg | 30/276 |
| 4,285,127 | 8/1981 | Zerrer et al. | 30/276 |
| 4,349,962 | 9/1982 | Itagaki | 30/347 |
| 4,426,780 | 1/1984 | Foster | 30/347 |
| 4,483,069 | 11/1984 | Moore | 30/276 |
| 4,566,189 | 1/1986 | Muto | 30/276 |
| 4,584,771 | 4/1986 | Tillotson | 30/347 |

Primary Examiner—Jimmy C. Peters
Attorney, Agent, or Firm—Walter Ottesen

[57] ABSTRACT

A cutterhead is disclosed for a motor-driven vegetation cutter and has a rotating housing and a spool journalled therein on which a cutting filament is wound. The spool has a plurality of cams, which coact with at least two spring-loaded coupling members pivotally mounted on the housing for paying out the cutting filament in incremental lengths. Each of the coupling members is pivotally journalled on its own pivot mount on the housing such that it is pivotable in dependence upon centrifugal force. The pivotable coupling members are synchronously displaceable and are coupled to one another for this purpose via an intermediate ring which is supported on the housing so as to be freely rotatable with respect thereto.

16 Claims, 3 Drawing Figures

CUTTERHEAD FOR A VEGETATION CUTTER

FIELD OF THE INVENTION

The invention relates to a cutterhead for a motor-driven vegetation cutter. The cutterhead has a rotatable housing and a spool journalled in the housing. The spool holds a cutting filament wound thereon and includes cams mounted thereon. The cutterhead also has at least two spring-loaded coupling members corresponding to the cams and journalled so that they are displaceable in dependence upon centrifugal force to incrementally unwind the cutting filament.

BACKGROUND OF THE INVENTION

In a cutterhead of this type, known from U.S. Pat. No. 4,104,796, opposed coupling members configured as sliders are provided in a rotatably mounted casing and are each biased by a helical spring; at a predetermined centrifugal force, the sliders slide outwardly counter to the force of the springs. This releases the coupling connection between the sliders and the cams on the spool so that the spool can rotate to feed out the cutting filament to some extent. After the centrifugal force drops because of the readjustment of the cutting filament, the helical springs force the sliders back into their initial position, so that one of the cams abuts the slider thereby fixing the spool. The cutting filament can be fed out again only after the predetermined centrifugal force is reached in response to the cutting filament becoming shorter due to wear whereupon the sliders slide outwardly to again unlatch the spool.

A substantial disadvantage is that the sliders, guided linearly, come into action independently of one another in order to release the spool in dependence upon centrifugal force. If in fact one of the two sliders does not shift synchronously with the other slider, for instance because it has become soiled and the friction on the two sliders differs, then either the detent coupling does not index at all, or the spool is permanently released thereby allowing the cutting filament to unreel freely. The known cutterhead is therefore quite vulnerable to malfunctioning as a function of the varying friction of the two sliders in their guideways. This cutterhead is also expensive to manufacture because the parts must be very accurately configured and guided.

In another cutterhead, of a different type, a single pivotable lever is provided on the housing. This lever is somewhat similar to the swinging of a spring clockwork and has two stops, which cooperate in alternation with cams of the spool that rest tightly beside one another like toothed rings.

In still another cutterhead, disclosed in European patent application No. 84307043.4, the release of the camlocked spool is effected as a function of centrifugal force by the rise or upward travel of balls shifting on inclined surfaces; as a result, lower stops located on the spool become disengaged from the associated counter-stops, and the upper stops release the length of the cutting filament by rotating the spool a predetermined amount. After readjustment, that is, after the cutting filament has been lengthened, the force of the spring located in the housing lid predominates and forces the rotatable spool back into its initial position, because the lessening of centrifugal force causes the balls to return to their initial position. The disadvantage here is that during the cutting operation, the cutting filament does not always assume an exactly horizontal position; instead, it may extend obliquely either upwardly or downwardly, depending on the resistances encountered during cutting. As a result, there are centrifugal force components of various magnitudes in the vertical direction which can have an uncontrollable effect on readjustment. It may even happen that when the balls begin to move upwardly, a premature and unintentional resonance buildup due to unpredictable vertical centrifugal force components may bring about the triggering or lowering operation, resulting in a continuous adjustment regardless of the rotational speed.

SUMMARY OF THE INVENTION

It is an object of the invention to provide a cutterhead of the type discussed above such that a positively controlled pivot-indexing function of a plurality of coupling members is attained that is free of malfunction and substantially unaffected by external influences.

According to the invention, this object is attained by providing that coupling members, each pivotably mounted on a journal, are coupled together and are synchronously displaceable via an intermediate ring that is journalled on the housing so as to be freely rotatable with respect to the latter.

BRIEF DESCRIPTION OF THE DRAWING

The invention will now be described with reference to the drawing wherein.

DESCRIPTION OF THE PREFERRED EMBODIMENTS OF THE INVENTION

Figure 1:
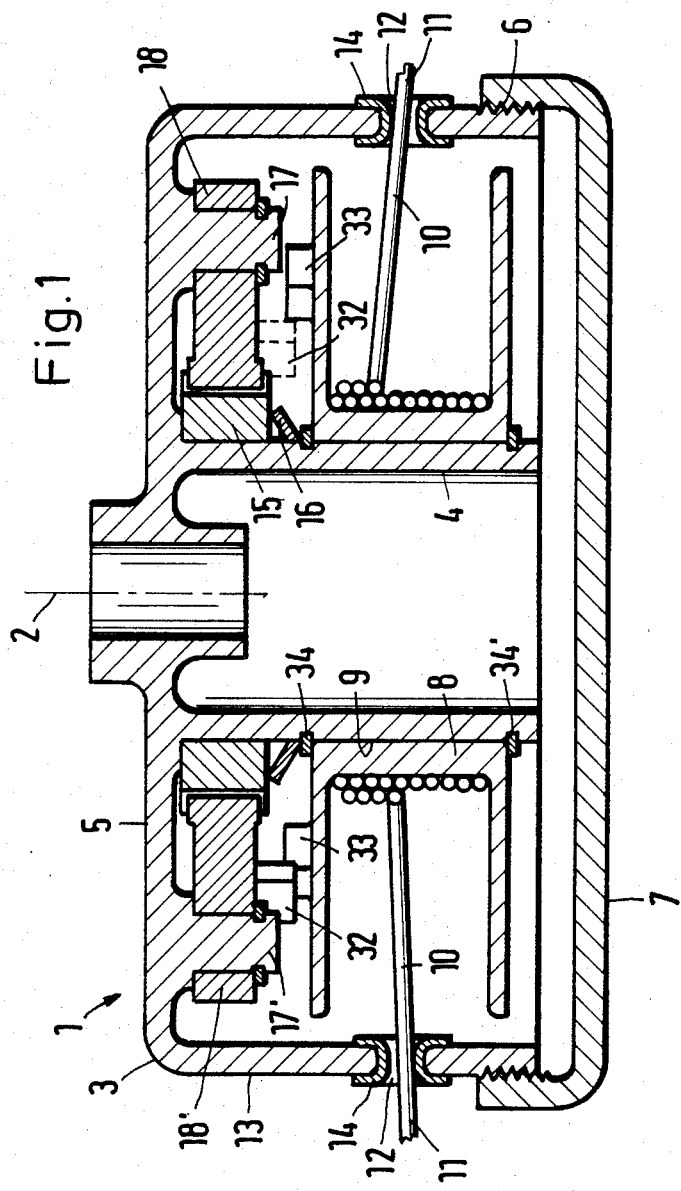
FIG. 1 is a sectional view of an embodiment of a cutterhead according to the invention.

The cutterhead 1 shown in the drawing is part of a vegetation cutter, not shown in further detail, which is preferably used for cutting grasses and the like. The cutterhead 1 is driven by a motor (not shown) of the vegetation cutter and, on being driven, the cutterhead rotates about the drive axis 2. The cutterhead 1 has an approximately cup-shaped housing 3 having a hub 4 in its central region. The housing 3 is closed off on the end thereof lying opposite to the base wall 5 by a lid 7 which threadably engages the housing by means of threads 6. The hub 4 is provided with securing rings 34, 34' for securing a spool 8.

The spool 8 is provided in the housing 3 and is freely rotatably journalled on the peripheral surface 9 of the hub 4 so as to be coaxial with the drive axis 2. A cutting filament 10 is wound on the spool 8. The filament may, for example, be a Perlon filament or the like, and its free end portion 11 is guided to the outside through an opening 12 in the peripheral wall 13 of the housing 3. To reduce wear to a minimum, the opening 12 is located in a guide element 14 which is retained in the peripheral wall 13.

Also located in the housing 3 is an intermediate ring 15, which is likewise freely rotatably journalled on the peripheral surface 9 of the hub 4 so as to be coaxial with the drive axis 2. Advantageously, the bearing friction of the intermediate ring 15 is dimensioned to effect a certain amount of damping. If the structurally determined ratios of friction are insufficient for complete damping, an additional friction brake can be provided in a simple manner. The additional friction brake can be, for example, in the form of a spring-loaded friction ring which presses directly upon the intermediate ring 15 and brakes the latter such that the intermediate ring 15 cannot be moved except in response to a somewhat higher displacing force. The intermediate ring 15 rests with one end face on the inner surface of the base wall 5 and, on its other end face, it is mounted on the hub 4 via the securing ring 34 with a plate spring 16 provided therebetween as a damping member.

Two journalling mounts 17, 17' extend from the inner surface of the base wall 5 of the housing 3 and are diametrically opposite one another. Coupling members 18, 18' are pivotally journalled on the two mounts 17, 17' and each coupling member is configured as a bell-crank lever or two-armed angle piece having a pivot arm 19 and a lever arm 20. The angle between the pivot arm 19 and the lever arm 20 may advantageously be approximately 100° to 150°.

Approximately in the middle between the pivot arm 19 and the lever arm 20, in the direction toward the drive axis 2, there is a bulge 21 on which a protruding tooth 22 is formed. The tooth 22 of each coupling member 18, 18' engages a tooth gap 23. The tooth gaps 23, 23' are formed on the outer periphery of the intermediate ring 15. By means of this tooth configuration, the two coupling members 18, 18' are coupled to one another via the intermediate ring 15. Thus, if one coupling member 18 executes a pivoting movement, the other coupling member 18' is pivoted as well, synchronously and in the same direction, via the intermediate ring 15.

Each of the two coupling members 18, 18' has its own associated retaining spring 24, which is preferably in the form of a V-shaped leaf spring. The retaining spring 24 is fixed on the housing 3 in that one leg 25 of the retaining spring 24 is supported in a form-fitting manner in a slit recess 26 of the housing 3. The other leg 27 of the V-shaped retaining spring 24, with its free end, overlaps the end portion of the lever arm 20, which is configured as a latching protrusion 28, so that the coupling members are spring-loaded in such a manner that at an appropriately high rotational speed of the cutterhead 1 imparted to the latter by a drive shaft rotating about the drive axis 2, and given sufficiently great centrifugal force on the pivot arm 19, the pivot arm 19 pivots radially outwardly in the direction of the arrow 30 and counter to the force of the retaining spring 24. To enable the coupling members 18, 18' to execute the above-described pivoting movement as a function of centrifugal force, the center of gravity 31 of each coupling member is located outside the pivot axis in the area between the journalling mounts 17, 17' and the free end of the pivot arm 19 on which a stop 32 is provided.

On one end face of the spool 8, a total of seven cams 33 in the embodiment shown, are arranged on a circle at equal intervals from one another. It may also be desirable to provide five or ten cams 33, for example, instead of seven, on the spool 8. These cams 33 correspond with the stops 32 of the coupling members 18, 18'.

Figure 2:
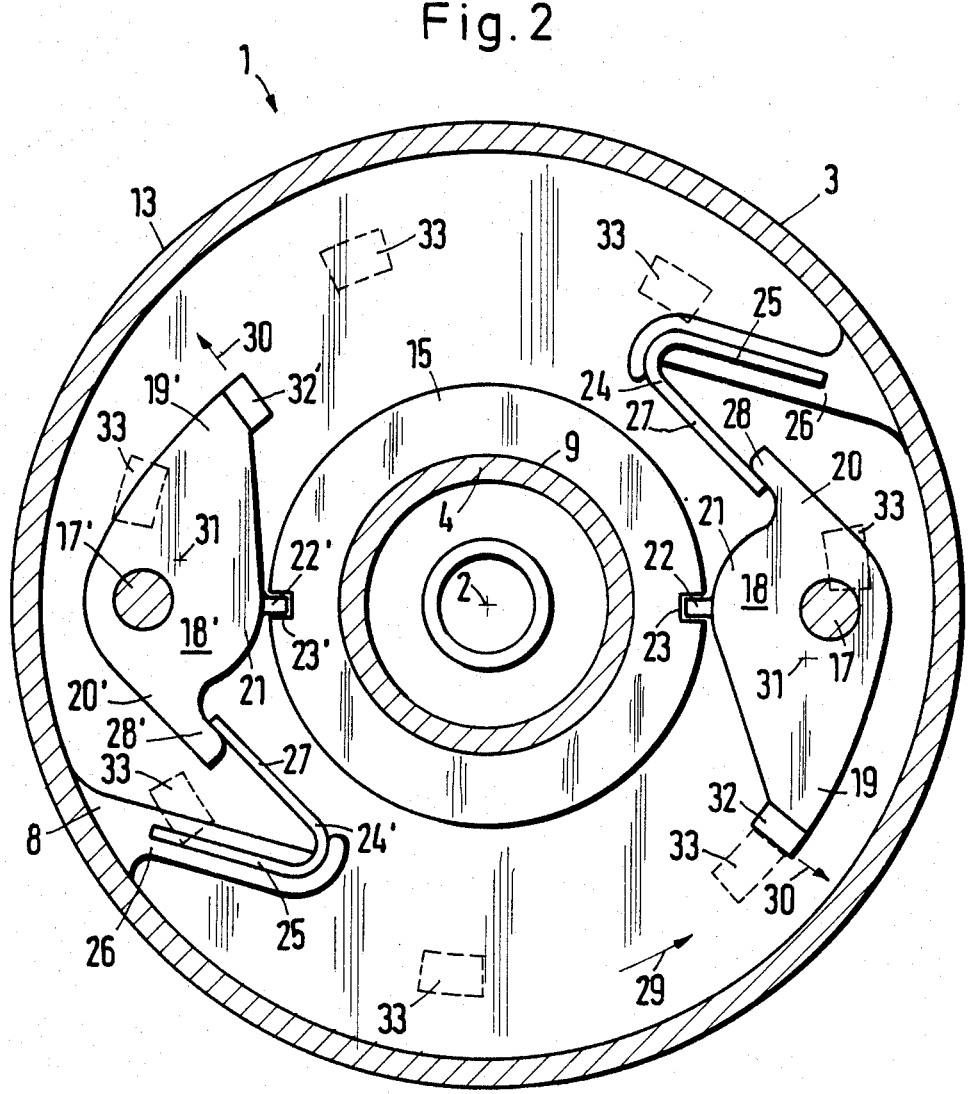
FIG. 2 is another view into the interior of the cutterhead of FIG. 1 showing the coupling members thereof in the rest position; and, FIG. 3 is a view similar to FIG. 2, but with the coupling members located in the outwardly pivoted position in response to centrifugal force.
Figure 3:
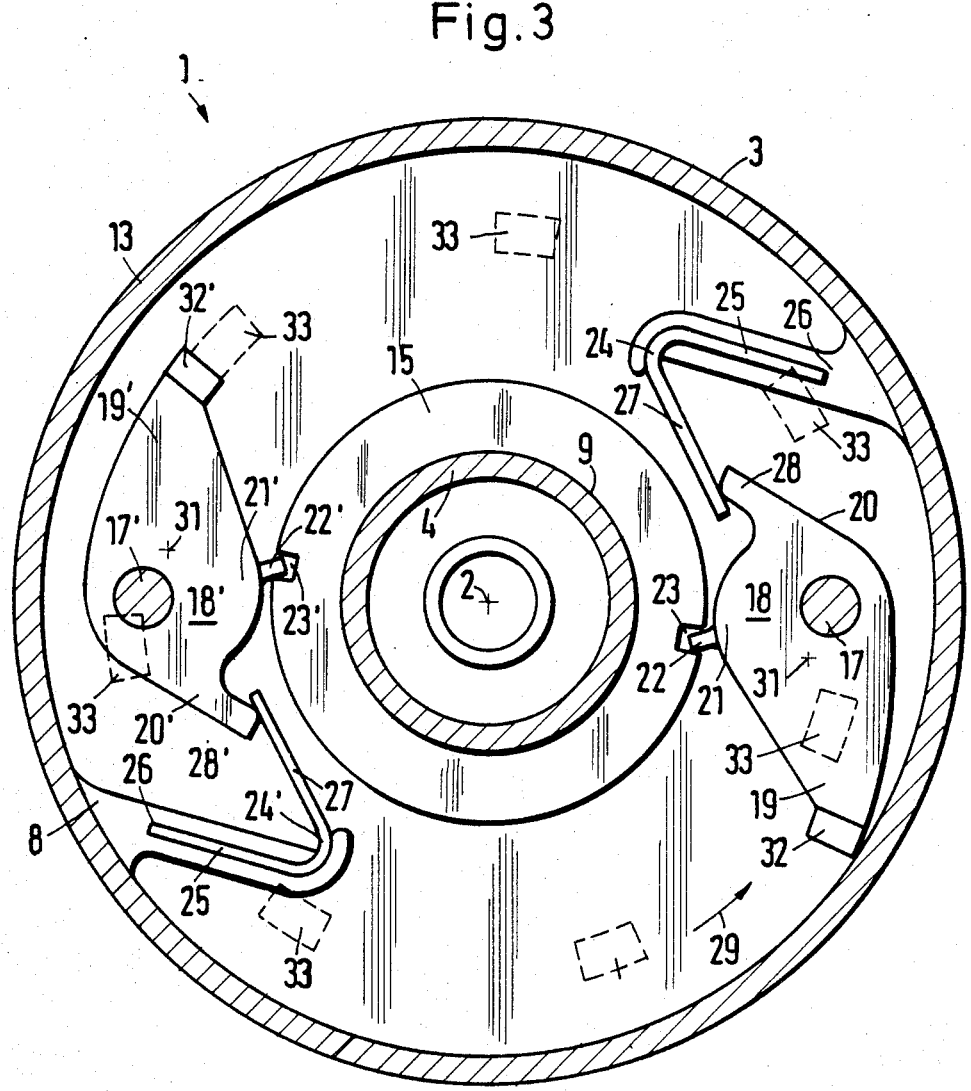

A closer look at FIGS. 2 and 3 shows that the two coupling members 18, 18' are configured somewhat differently from one another, in that the angle between the pivot arm 19 and the lever arm 20 is somewhat larger in the coupling member 18 than in the opposite coupling member 18'. As a result, the radial distance between the drive axis 2 and the stop 32 is greater for the coupling member 18 than for the other coupling member 18'. In FIG. 2, the coupling members 18, 18' are shown in their non-pivoted rest positions. FIG. 2 shows that the coupling member 18 is in a latching position with one of the cams 33 resting on the stop 32. The opposite coupling member 18' is in its release position because the radial distance between the stop 32' thereof and the drive axis 2 is less than the radial distance between the cams 33 and the drive axis 2.

In FIG. 3, the coupling members 18, 18' are located in their positions in which they are swivelled open, and as this figure shows, the coupling member 18 has now assumed its release position, since the pivot arm 19 has been displaced as far as the peripheral wall 13 of the housing 3, so that the radial distance between the stop 32 and the drive axis 2 is greater than the radial distance between the cams 33 and the drive axis 2. In the case of the other coupling member 18', the stop 32' is now located in the circular path of the cams 33. The coupling member 18' is thus in its locking position, and the radial distance between the stop 32' and the drive axis 2 is equal to the radial distance between the cams 33 and the drive axis 2.

During a cutting operation, the rotation of the housing 3 and spool 8 is effected by the drive provided via the drive shaft rotating about drive axis 2. This rotation carries along the housing 3 and all the parts journalled therein such as the spool 8 and the intermediate ring 15. Since one cam 33 of the spool 8 is resting on the stop 32 of the coupling member 18 (FIG. 2), the spool 8 is latched in the housing 3.

Once the cutting filament 10 has worn down, the rotational speed of the cutterhead 1 increases, and the centrifugal force rises up to a predetermined level. This level is determined by the magnitude of the weight of the coupling member and of the force of the retaining spring 24. Thus, if a predetermined magnitude of centrifugal force is reached, the coupling members 18, 18', which are held in the rest position by the retaining springs 24, move outwardly with their pivot arms 19, 19' because the center of gravity 31 is located outside of their pivot center defined by mounts 17, 17'.

Upon this outwardly directed movement of the pivot arm 19, the stop 32 of the one coupling member 18 clears the way for the cam 33 resting thereagainst. The spool can now rotate in the direction of the arrow 29, that is, counterclockwise. This rotational movement is arrested by the abutment of the cam 33 on the opposite side with the stop 32' of the other coupling member 18'. The spool 8 has thus rotated or indexed through an angular increment in the direction of the arrow 29. The latched position of the coupling member 18' is attained by a positive control via the intermediate ring 15 and independently of the action of the centrifugal force. On the outwardly pivoting movement of the coupling member 18, its tooth 22 takes the intermediate ring 15 along therewith in the clockwise direction; as a result, because of the gear-like rotational displacement of the intermediate ring 15 and because of the tooth mesh between the coupling member 18' and the intermediate ring 15, the pivot arm 19' of the coupling member 18' is positively moved outwardly thereby attaining the above-described latching position for the cam 33 on the stop 32' of the coupling member 18'.

After the first adjusting increment has been executed, the length of the extended cutting portion of the cutting filament 10 is readjusted by a predetermined amount. As a result of this readjustment, the centrifugal force drops, and the effect of this, in turn, is that the retaining spring 24 presses the one coupling member 18 back into its initial position, so that in this rest position the stop 32 of the pivot arm 19 resumes its radially inwardly directed initial position and the tooth 22 of the coupling member 18, which has not moved out of the tooth gap 23 during the displacement, is returned to its original starting position (FIG. 2).

It is understood that the displacement travel can be arranged to suit given requirements by appropriately dimensioning the teeth 22, the tooth gaps 23 and the length of the pivot arms 19 as well as by appropriately arranging the stops 32, 32'.

If the coupling member 18 has pivoted back out of its radially outward position into its initial position under the force of the retaining spring and in response to the drop in centrifugal force and has rotated the intermediate ring 15 slightly counterclockwise via the tooth 22, then the other coupling member 18' is pivoted back into its rest position (initial position) via the corresponding tooth gap 23' and via its tooth 22' that engages this tooth gap. The action of centrifugal force is unnecessary here because the return pivoting of the coupling member 18' is effected by the coupling that exists in accordance with a feature of the invention between the one coupling member 18 and the other coupling member 18'. Thus positive guidance for a synchronous displacement is provided for both the outward swivelling and the return swivelling of the coupling members 18, 18'.

In order to avoid imbalance of the cutterhead 1, which typically rotates rapidly (approximately 10,000 revolutions per minute), both coupling members 18, 18' are advantageously configured to be substantially symmetrical and are provided with a holding spring 24, 24'. Accordingly, it becomes possible at the same time for the so-called passive coupling member 18' to become an active coupling member, namely, whenever the coupling member 18, which is structurally designed to be the active member, should become inactive due to malfunction, for whatever reason. In this situation, the coupling member 18 is driven in coupled fashion by the now-activated coupling member 18' via the positive guidance of the intermediate ring 15 and is moved into the indexed positions described.

The essential advantage of the cutterhead 1 according to the invention is that there is positive guidance between two coupling members 18, 18' which obviates the need of matching these parts with particular accuracy because an exact synchronous movement of the two coupling members 18, 18' is always effected. Furthermore, the cutterhead 1 of the invention is substantially more reliable functionally, because if an active coupling member should fail the other coupling member is activated immediately, and so satisfactory functioning is always assured via the positive guidance provided in accordance with the invention. In addition, the cutterhead 1 according to the invention has no sensitively guided sliders; instead, the coupling members 18, 18' are exclusively provided for uncomplicated pivoting movements that are not vulnerable to malfunctioning. Malfunctions due to moisture, soiling and friction are thus largely precluded.

The cutterhead embodied according to the invention is particularly intended for use in brushcutters. Such brushcutters are typically driven by a two-stroke motor with relatively high vibration, via rods. In addition to the vibration generated by the motor, other vibration and shocks are produced by the uneven engagement of the cutting filament. The vibrations originating in the drive motor, which are transmitted and built up via the structurally necessary drive axis or drive rod, together with the vibrations and shocks originating in the cutterhead, produce a resonance effect, which impairs the operation of the cutterhead as a whole and especially in that the feeding out of additional cutting filament then no longer takes place exactly in dependence upon the desired rotational speed.

Accordingly, the invention further provides that the spring/mass system, which is embodied by the cutterhead, is additionally damped. This damping is effected in addition to the damping already existing in the cutterhead or in the system and provided as a result of inevitable friction. This friction-conditioned damping, however, is inadequate, because it is subject to considerable variation due to manufacturing tolerances as well as wear; thus, an accurately rpm-dependent damping based on existing friction ratios is not possible.

It is therefore provided, in a further embodiment of the invention, that an additional friction brake is provided in the cutterhead, which prevents resonance buildup in the cutterhead and at the same time assures that the cutting filament is fed out only at a predetermined rotational speed.

In a preferred embodiment of the invention, it is provided that the securing ring 34 is disposed so as to be not directly adjacent to the intermediate ring 15 and is instead spaced axially therefrom. Also, a plate spring 16 is provided between the securing ring 34 and the intermediate ring 15. This plate spring 16 is supported on the securing ring 34, which is seated on the hub 4, and rests resiliently and with friction on the intermediate ring 15. Instead of a damping element in the form of the plate spring described, however, any other arrangement of damping members is also possible.

It is understood that the foregoing description is that of the preferred embodiments of the invention and that various changes and modifications may be made thereto without departing from the spirit and scope of the invention as defined in the appended claims.

What is claimed is:

1. A cutterhead for a motor-driven vegetation cutter defining a drive axis about which the cutterhead is rotatably driven, the cutterhead comprising, a housing adapted to be rotated by the vegetation cutter about said drive axis;

a spool rotatably journalled in said housing for carrying a cutting filament wound thereon;

a plurality of cams on said spool;

two resiliently-biased individual coupling members pivotally mounted at separate locations on said housing for pivotal movement with respect to the latter and for coacting with corresponding ones of said cams for indexing said spool to pay out incremented lengths of the cutting filament in dependence upon centrifugal force; and, a synchronous coupler rotatably mounted on said housing so as to permit rotational movement with respect to the latter and for coupling said two individual coupling members to each other so as to synchronously displace one of said individual coupling members in response to a pivotal displacement movement of the other one of said individual coupling members.

2. A cutterhead for a motor-driven vegetation cutter defining a drive axis about which the cutterhead is rotatably driven, the cutterhead comprising:

a housing adpated to be rotated by the vegetation cutter about said drive axis;

a spool rotatably journalled in said housing for carrying a cutting filament wound thereon;

a plurality of cams on said spool;

two resiliently-biased coupling members pivotally mounted on said housing for coacting with corresponding ones of said cams for indexing said spool to pay out incremented lengths of the cutting filament in dependence upon centrifugal force; and, synchronous coupling means for coupling said coupling members together so as to be synchronously displaceable with each other; said synchronous coupling means including an annular body journalled on said housing so as to be freely rotatable with respect to the latter; and, meshing means for meshing said coupling members with said annular body whereby the displacement of one of said coupling members is synchronously transmitted to the other one of said coupling members.

3. The cutterhead of claim 2, said housing including: a hub formed therein coaxially to said axis, said annular body being rotatably journalled on said hub; and, pivot mounts formed thereon for pivotally mounting corresponding ones of said coupling members.

4. The cutterhead of claim 3, said meshing means including a tooth formed on each one of said coupling members and at least two slots formed on said annular body for accommodating corresponding ones of the teeth on said coupling members in a form-tight manner.

5. The cutterhead of claim 3, said pivot mounts being mounted on said housing on diametrically opposite sides of said axis.

6. The cutterhead of claim 4, each of said coupling members being configured as a bell-crank lever having a pivot arm and a lever arm, said pivot arm having a stop formed thereon for coacting with the corresponding one of said cams, said cutterhead further comprising holding springs for resiliently biasing corresponding ones of the bell-crank levers in a direction opposite to said centrifugal force.

7. The cutterhead of claim 6, the tooth of each of said coupling members being formed thereon so as to be disposed in the outer region thereof between said pivot arm and said lever arm.

8. The cutterhead of claim 6, each of said pivot mounts defining a pivot axis about which the coupling member corresponding thereto pivots, and each one of said coupling members having a center of gravity which is located in the region between the stop and the pivot axis corresponding thereto.

9. The cutterhead of claim 6, each of said holding springs having V-shaped configuration; said housing having a slot for accommodating one of the arms of said V-shaped holding spring therein; and, the coupling member having a latching nose formed thereon for receiving the other arm of said spring in contact engagement therewith whereby said spring resiliently biases said coupling lever in said direction.

10. The cutterhead of claim 6, said coupling member being configured so as to cause the stop of one of said members to be a radial distance away from said drive axis which is greater than the radial distance that the stop of the other one of said coupling members is from said drive axis.

11. The cutterhead of claim 6, said coupling members being mounted on said housing so as to cause the stop of one of said members to be a radial distance away from said drive axis which is greater than the radial distance that the stop of the other one of said coupling members is from said drive axis.

12. The cutterhead of claim 6, said plurality of cams being arranged in two sets of cams arranged on respective circles coaxial with said drive axis; each of said coupling members being pivotally movable between an at-rest first position and a swung-out second position, one of said coupling members being arranged so that the stop corresponding thereto engages a cam on one of said circles when said one coupling member is in its first position and the other one of said coupling members being arranged so that the stop corresponding thereto engages a cam on the other one of said circles when said other one of said coupling members is in the second position thereof.

13. The cutterhead of claim 12, each one of said sets of cams consisting of five to ten cams spaced one next to the other at equal intervals along the circle corresponding thereto.

14. The cutterhead of claim 13, each one of said sets of cams consisting of seven cams.

15. The cutterhead of claim 6, comprising damping means for damping the pivotal movement of said coupling members.

16. The cutterhead of claim 15, said damping means including a supporting ring mounted on said hub; and, a plate spring disposed in surrounding relationship to said hub and disposed between said supporting ring and said annular body.

* * * * *